US009905056B2

(12) United States Patent
Bowers et al.

(10) Patent No.: US 9,905,056 B2
(45) Date of Patent: Feb. 27, 2018

(54) SYSTEMS, METHODS, AND COMPUTER READABLE MEDIA FOR TRANSFERRING DATA FROM DELIVERY ITEMS TO LABELS FOR APPLICATION OF THE LABELS ONTO THE DELIVERY ITEMS

(71) Applicant: BELL AND HOWELL, LLC, Durham, NC (US)

(72) Inventors: Brian Bowers, Mundelein, IL (US); Steven Seburn, Buffalo Grove, IL (US); Helmut Joerg, Zusmarshausen (DE); Michael Maeder, Cologne (DE)

(73) Assignee: Fluence Automation LLC, Wheeling, IL (US)

( * ) Notice: Subject to any disclaimer, the term of this patent is extended or adjusted under 35 U.S.C. 154(b) by 0 days.

(21) Appl. No.: 14/842,139

(22) Filed: Sep. 1, 2015

(65) Prior Publication Data

US 2016/0063770 A1    Mar. 3, 2016

Related U.S. Application Data

(60) Provisional application No. 62/044,786, filed on Sep. 2, 2014.

(51) Int. Cl.
  *B65C 9/40*    (2006.01)
  *G07B 17/00*    (2006.01)
  (Continued)

(52) U.S. Cl.
  CPC .......... *G07B 17/00508* (2013.01); *B07C 3/14* (2013.01); *B32B 37/025* (2013.01);
  (Continued)

(58) Field of Classification Search
  CPC ........ B07C 3/14; B32B 37/025; B41J 3/4075; B65C 1/021; B65C 9/46; B65C 2009/401;
  (Continued)

(56) References Cited

U.S. PATENT DOCUMENTS 5,770,841 A * 6/1998 Moed .................... B07C 3/14
                                                235/375
5,954,913 A * 9/1999 Wurz .................. B65C 1/021
                                                156/360

(Continued)

FOREIGN PATENT DOCUMENTS

JP      2001-129488 A      5/2001
JP      2001129488 A  *    5/2001

OTHER PUBLICATIONS

Notification of European publication number for Application No. EP 15183294 dated Feb. 24, 2016.

(Continued)

*Primary Examiner* — George Koch
(74) *Attorney, Agent, or Firm* — Jenkins, Wilson, Taylor & Hunt, P.A.

(57) ABSTRACT

Systems, methods, and computer readable media for transferring data from a delivery item to a label for application of the label onto the delivery item are disclosed. In some aspects, the system can include a camera configured to capture an image of the data on the delivery item, a control computer including at least one hardware processor and memory, the control computer being configured to process the image of the data, integrate the image of the data into a label template, and to generate a print file from the label template, and at least one label applicator disposed after the camera relative to a direction of travel of the delivery item on a conveyor, the at least one label applicator being configured to print the label including the data contained in the print file and apply the printed label onto a top surface of the delivery item.

21 Claims, 7 Drawing Sheets

(51) Int. Cl.
    *B32B 37/00*    (2006.01)
    *B41J 3/407*    (2006.01)
    *H04N 7/18*    (2006.01)
    *G06K 9/00*    (2006.01)
    *H04N 5/262*    (2006.01)
    *B07C 3/14*    (2006.01)
    *B65C 1/02*    (2006.01)
    *B65C 9/46*    (2006.01)
    *G06K 9/32*    (2006.01)

(52) U.S. Cl.
    CPC ............ *B41J 3/4075* (2013.01); *B65C 1/021* (2013.01); *B65C 9/46* (2013.01); *G06K 9/00469* (2013.01); *G06K 9/3233* (2013.01); *G07B 17/00661* (2013.01); *H04N 5/2628* (2013.01); *H04N 7/18* (2013.01); *B65C 2009/401* (2013.01); *B65C 2009/408* (2013.01); *G06K 2209/01* (2013.01); *G07B 2017/0062* (2013.01); *G07B 2017/00588* (2013.01); *G07B 2017/00596* (2013.01); *G07B 2017/00725* (2013.01)

(58) Field of Classification Search
    CPC .......... G06K 9/18; G06K 9/3233; G06K 9/46; G06K 9/6201; G07B 17/00508; G07B 17/00661; H04N 5/2628; H04N 7/18
    See application file for complete search history.

(56) References Cited

U.S. PATENT DOCUMENTS

| | | | |
|---|---|---|---|
| 6,179,030 B1* | 1/2001 | Rietheimer | B41J 3/4075 156/360 |
| 2002/0084014 A1* | 7/2002 | Klein | B65C 9/1869 156/64 |
| 2006/0231209 A1* | 10/2006 | Smith | B65C 1/02 156/542 |
| 2010/0145504 A1* | 6/2010 | Redford | B07C 3/14 700/227 |
| 2013/0118136 A1* | 5/2013 | Arima | B65C 3/065 53/585 |

OTHER PUBLICATIONS

European Search Report for Application No. EP 15183294 dated Feb. 18, 2016.

* cited by examiner

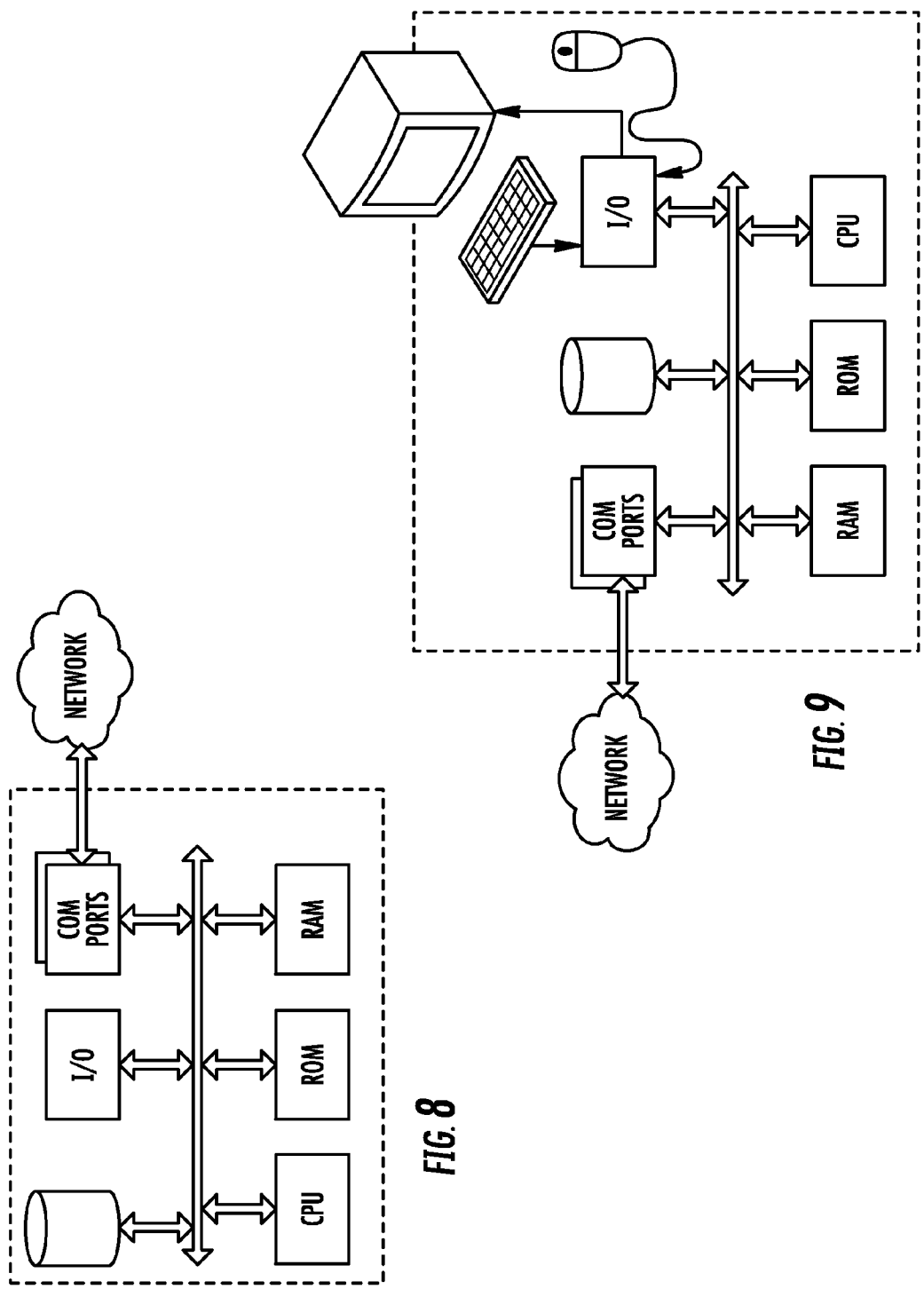

SYSTEMS, METHODS, AND COMPUTER READABLE MEDIA FOR TRANSFERRING DATA FROM DELIVERY ITEMS TO LABELS FOR APPLICATION OF THE LABELS ONTO THE DELIVERY ITEMS

CROSS-REFERENCE TO RELATED APPLICATION

This application relates to and claims priority to U.S. Provisional Patent Application Ser. No. 62/044,786 filed Sep. 2, 2014, the disclosure of which is incorporated by reference herein in the entirety.

TECHNICAL FIELD

The subject matter presented herein discloses labeling delivery items, such as a package or envelope, while moving on a conveyer and using a vertical positioning assembly to position at least one label applicator, which is fed from a roll of labeling linerless material. More particularly, the subject matter presented herein discloses systems, methods, and computer readable media for transferring data from delivery items to labels for application of the labels onto the delivery items.

BACKGROUND

Package labeling for warehouse and distribution applications, as well as sorting operations for packages and envelopes, typically requires a delivery service shipping label to be placed on the delivery item. The printed information on the label consists of at least barcodes and human readable data. When the package or envelope enters a package and envelope labeling and processing line, the package or envelope is oriented so that name and address data printed or applied onto an upward facing side of the package or envelope. There are no other constraints on the orientation of the name and address data. As a result, the name and address data can be at any location on the upward facing side of the package or envelope, as well as in any orientation. In addition, the name and address data can be disposed on a label, printed or hand written directly on the envelope or package, and/or visible through a window or packing list sleeve.

The unknown location and orientation of the name and address data can result in an automatic label applicator placing a delivery service shipping label, from a third party carrier, on the package or envelope. Depending on the orientation and the location of the original name and address block, the label may obscure or cover up the original name and address block. In this case, the delivery carrier (e.g., a postman or courier) will not know the name or address, which results in the delivery carrier being unable to deliver the package or envelope. Even if a delivery point code such as the USPS ZIPCODE®, FEDEX®, DPD®, or another third party delivery code is on the shipping label, quality and security concerns may restrict delivery if the original name and address data is unavailable. Further degradation in performance of the delivery service operations may also occur due to inconsistent automated placement of the delivery service shipping label on the package or envelope.

In order to avoid restriction of delivery due to unavailability of the name and address data, current labeling systems may manually place a delivery service shipping label, from a third party carrier, on the package or envelope. In this case, sorting may be completed by an automated sorting subsystem. However, manual placement of the delivery service shipping label may be inefficient, as it will require one or more human user in order to place the delivery service shipping label. Another method of avoiding restriction of delivery due to unavailability of the name and address data may include determining a position of the address block on the package or envelope and moving the label applicator cross ways, accordingly, to the conveyor belt direction of travel before applying the delivery service shipping label in order to avoid labeling over the name and address data. However, cross ways relocation adds complexity and cost to the labeling system and contributes to throughput reduction. There also is an increase in the error rate since cross ways movement of a label applicator may not be sufficient enough to avoid obscuring or covering up the original name and address data.

Hence, a need exists for a system for imaging or scanning a top surface of a package or envelope with a camera or any other suitable imaging device capable of outputting the scanned representation of the address block, locating an original name and address data, and integrating a representation of the original name and address data into a delivery service shipping label for application onto the package or envelope. In addition, a need exists for a system capable of accepting and processing an image or PDF file of a name and address block and correcting for size, orientation, skew, and quality. A need also exists for a system capable of orienting a labeler during operation in order to adjust for variously sized workpieces.

SUMMARY

Systems, methods, and computer readable media for transferring data from delivery items to labels for application of the labels onto the delivery items are disclosed herein. In some aspects, systems can comprise a camera configured to capture an image of the data on the delivery item, a control computer including at least one hardware processor and memory, the control computer being configured to process the image of the data, integrate the image of the data captured by the camera into a label template, and to generate a print file from the label template, and at least one label applicator disposed after the camera relative to a direction of travel of the delivery item on a conveyor, the at least one label applicator being configured to print the label including the data contained in the print file and apply the printed label onto a top surface of the delivery item.

In some aspects, methods can be performed at a control computer including at least one hardware processor and memory, and can comprise interfacing with a camera and at least one label applicator disposed after the camera relative to a direction of travel of the delivery item on a conveyor, capturing, by the camera, an image of the data on the delivery item, integrating, the image of the data captured by the camera into a label template, generating a print file from the label template, printing, by the at least one label applicator, the label including the data contained in the print file, and applying, by the at least one label applicator, the printed label onto a top surface of the delivery item.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

The advantages and novel features are set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations described herein.

BRIEF DESCRIPTION OF THE DRAWINGS

FIG. 8 illustrates a system diagram of an exemplary network or host computer platform, as may typically be used to implement a server according to some embodiments of the present subject matter.

FIG. 9 illustrates a system diagram of an exemplary computer with user interface elements, as may be used to implement a personal computer or other type of work station or terminal device according to some embodiments of the present subject matter.

DETAILED DESCRIPTION

Accordingly, systems, methods, and computer readable media for transferring data from a delivery item to a label for application of the label onto the delivery item are disclosed herein. Notably, the systems, methods, and computer readable media disclosed herein are capable of scanning a top surface of delivery items of various sizes and shapes with an optical scanner (e.g., a camera) configured to output a scanned representation of the address block in an image standard format (JEPG, TIFF, BMP, etc.,) or PDF format, locating original name and address data, capturing an image of the original name and address data, analyzing the captured image data in order to format an image for integration into an address area of a delivery service shipping label, and integrating the image or a representation thereof of the original name and address data into the delivery service shipping label for application onto the delivery item. The systems, methods, and computer readable media disclosed herein are also able to accept and process an image or PDF file of the name and address block and correct for size, orientation, skew, and quality.

As used herein, "delivery item", "mailpiece", "workpiece", and the like may be used to designate a package, container, envelope, etc., that is configured to be processed through a delivery item labeling and processing line as discussed herein.

As used herein, exemplary delivery service may include, but are not limited to, USPS®, UPS®, FEDEX®, DPD®, GLS®, POSTCON®, and DHL®.

Figure 1:
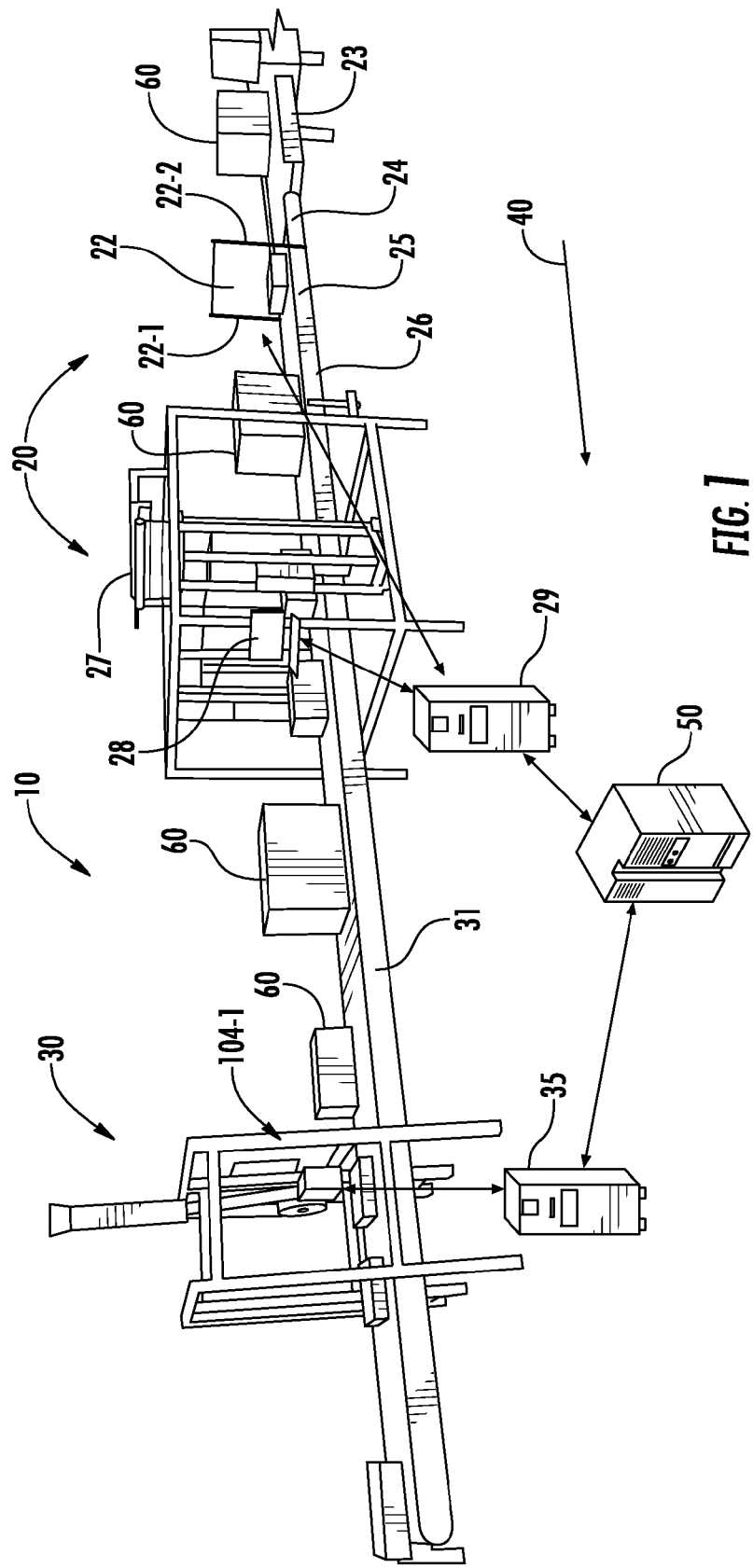
FIG. 1 illustrates a perspective view of an exemplary system including a camera, a control computer, and at least one label applicator for transferring data from a delivery item to a label for application of the label onto the delivery item according to some embodiments of the present subject matter.

Reference now is made in detail to the examples illustrated in the accompanying drawings and discussed below. FIG. 1 illustrates a system for transferring data from a delivery item to a label for application of the label onto the delivery item. Specifically, the system includes a delivery item labeling and processing line 10 for a warehouse, consolidator, or distribution center. Delivery items may include packages or envelopes that are slated to be delivered by a private or postal delivery service. For example, a delivery item may include a package 60, such as a box of various sizes and shapes, provided it is consistent with the system. In another example, a delivery item may include an envelope, such as envelope mail of various sizes and shapes, (see, e.g., FIG. 4) provided that it is consistent with the system.

In some embodiments, the packages 60 may enter the system from the right on a conveyer system 23 and travel to the left, as indicated by a directional arrow 40. The directional arrow 40 is provided as a common frame of reference from figure to figure. Notably, the label application system 30 is designed to operate in a bi-directional manner with one or more label printer-applicator assemblies 104-1. For example, a single label application system 30 can be used to apply stocking location labels on packages going to the warehouse and shipping labels to packages being routed from the warehouse to a delivery service via a shipping dock.

There are numerous applications for the warehouse and distribution center package labeling processing line 10 which include, but are not limited to warehouse stocking, distribution center, retail or wholesale, order fulfillment, hub sorting operations for delivery services, etc. The data on the preprinted label or data referenced by a barcode may include but is not limited to package contents, quantity, warehouse destination, retail or wholesale address, customer address, carrier (e.g., FEDEX®, UPS®, USPS®), etc. The application will dictate the contents and format of the label to be printed and applied by the label application subassembly 100-1. The processor and/or computer 29, 35 and server 50 configuration illustrated in FIG. 1 may be implemented in numerous ways depending on the design implemented by those skilled in the art.

In some embodiments, the packages 60 can be transferred from a shipping dock or warehouse through a package measurement and label reader system 20. The package measurement and label reader system 20 can include at least a package measurement subsystem 22 comprising a series of photo detectors distributed along sides 22-1, 22-2 to measure a height of the package 60. Package height is used for accurate placement of the label on the top of the package. A length of the package 60 can be measured by a length of time a height measurement is registering and the speed of conveyers 24 and 25. This height and length can be processed by the package measurement and label reader system computer 29 and transferred either through the server 50 or directly to a labeler control computer 35. One or more operator interfaces 28 are provided for setup and job control. The height and length data for each package is processed by the labeler computer 35 to determine a pitch between packages for maximum throughput based on a vertical position of label printer-applicator assembly 104-1 within the label application system 30.

A pitch-labeler control computer algorithm can be executed to determine the required package pitch by projecting the required vertical position of the label printer-applicator assembly 104-1 within each label application subsystem(s) (e.g., 100-1 and 100-2, FIG. 3), when the package that was just measured by the package measurement subsystem 22 arrives at the label application subsystem. The required vertical height is dictated by a height of the package and a vertical distance that the label printer-applicator assembly is configured to move to apply a label or clear the next package. The time of arrival of a given package at the label application system 30 is calculated by knowing the speed of conveyer 31 and the distance to be traveled. Sensors may be added along the conveyer path to update tracking accuracy and to confirm arrival of the package at the label application system 30 and the arrival at the specific label printer-applicator assembly 104-1 assigned to apply the label. The package pitch is minimized and the vertical motion of the label printer-applicator assembly 104-1 is minimized to maximize throughput. The pitch between packages is controlled by adjusting the speed of conveyers 24, 25 and 26 or by use of metering belts which stop and start in order to provide the correct gap. Although three conveyers are illustrated in FIG. 1, other configurations with more or less conveyors are contemplated. After the package height and length is measured, the package can be transferred to conveyer 31, which can be configured to move at a constant speed, and can transport the package 60 through an image subsystem 27. The image subsystem 27 can comprise an optical scanner (e.g., a camera) that can be configured to capture an image of the entire upward facing surface of the package or envelope.

Figure 2:
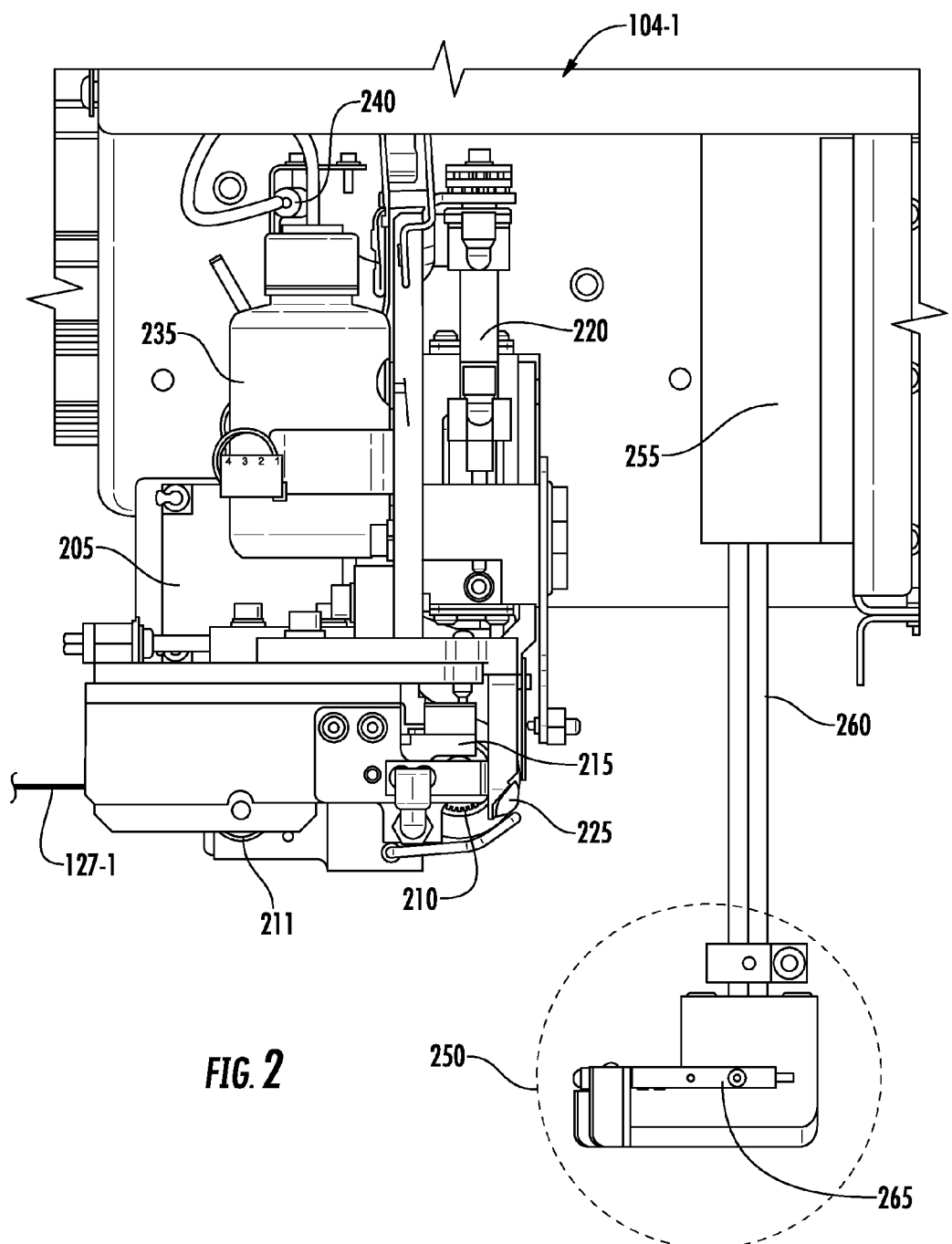
FIG. 2 illustrates a side view of an exemplary label applicator according to some embodiments of the present subject matter.

Referring now to FIG. 2, operation of a linerless label printer-applicator assembly 104-1 which can be used to apply the delivery service shipping label 141 are disclosed. Linerless label material can comprise material that does not have a backing material attached to the label material, which is required to prevent the glue from sticking the layers in the roll 120-1 together. Instead of a liner, the label glue is specially designed to have a weak adherence to the label material in the roll. Those skilled in the art may use a label applicator system that incorporates linered label material.

In FIG. 2, a label printer-applicator assembly 104-1 and an applicator 250, are illustrated, where the applicator 250 is shown in a down position of approximately six (6) inches from a bottom of a pneumatic assembly 255. One of skill in the art will understand that other distances may be used. In some embodiments, label material 127-1 can enter the label printer-applicator assembly 104-1 from the left. The label material 127-1 can be pulled into the assembly 104-1 by a pressure roller 210, which is driven by a motor 205. A plasma coated roller 211 can be positioned in an input section to stabilize a web of label material 127-1. A plasma coating may be used to prevent an adhesive from adhering the label material 127-1 to the roller 211. As the label material 127-1 is pulled into the assembly 104-1, a thermal printer 215 can print the label contents and the label material advances through the label cutter assembly 225 and onto the applicator 250 which is in the up position against the bottom of the pneumatic assembly 255. The cutter 225 can be actuated with a pneumatic cylinder 220. During the cutting operation, silicon oil can be applied to the blade 225 by a pump 240. The silicon oil can prevent adhesive buildup on the cutter blades, which will lead to cutter failure. An oil reservoir can be contained in a bottle 235. The applicator 250 can be driven by the pneumatic assembly 255 which can control motion of a connecting piston 260. Proximity or height measurement sensors 265 can be configured to signal a control box that the applicator 250 has nearly reached the package, and the pneumatic controls can adjust the speed and the remaining amount of stroke so that the label is applied firmly enough to stick by utilizing a forced air blast and to avoid the applicator from coming in contact with the package.

Figure 3:
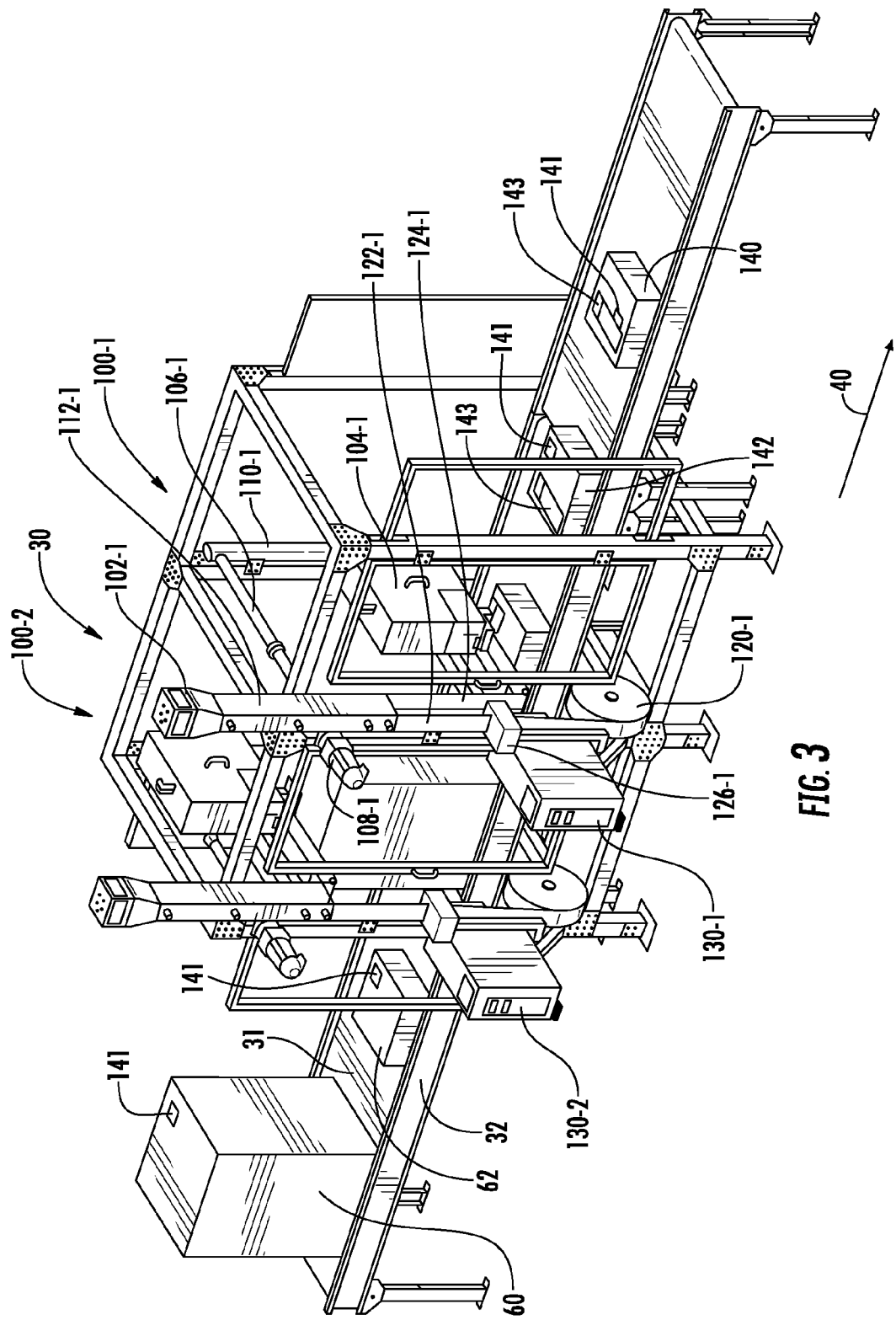
FIG. 3 illustrates a perspective view of an exemplary system including a camera, a control computer, and two label applicators transferring data from a delivery item to a label for application of the label onto the delivery item according to some embodiments of the present subject matter.
Figure 4:
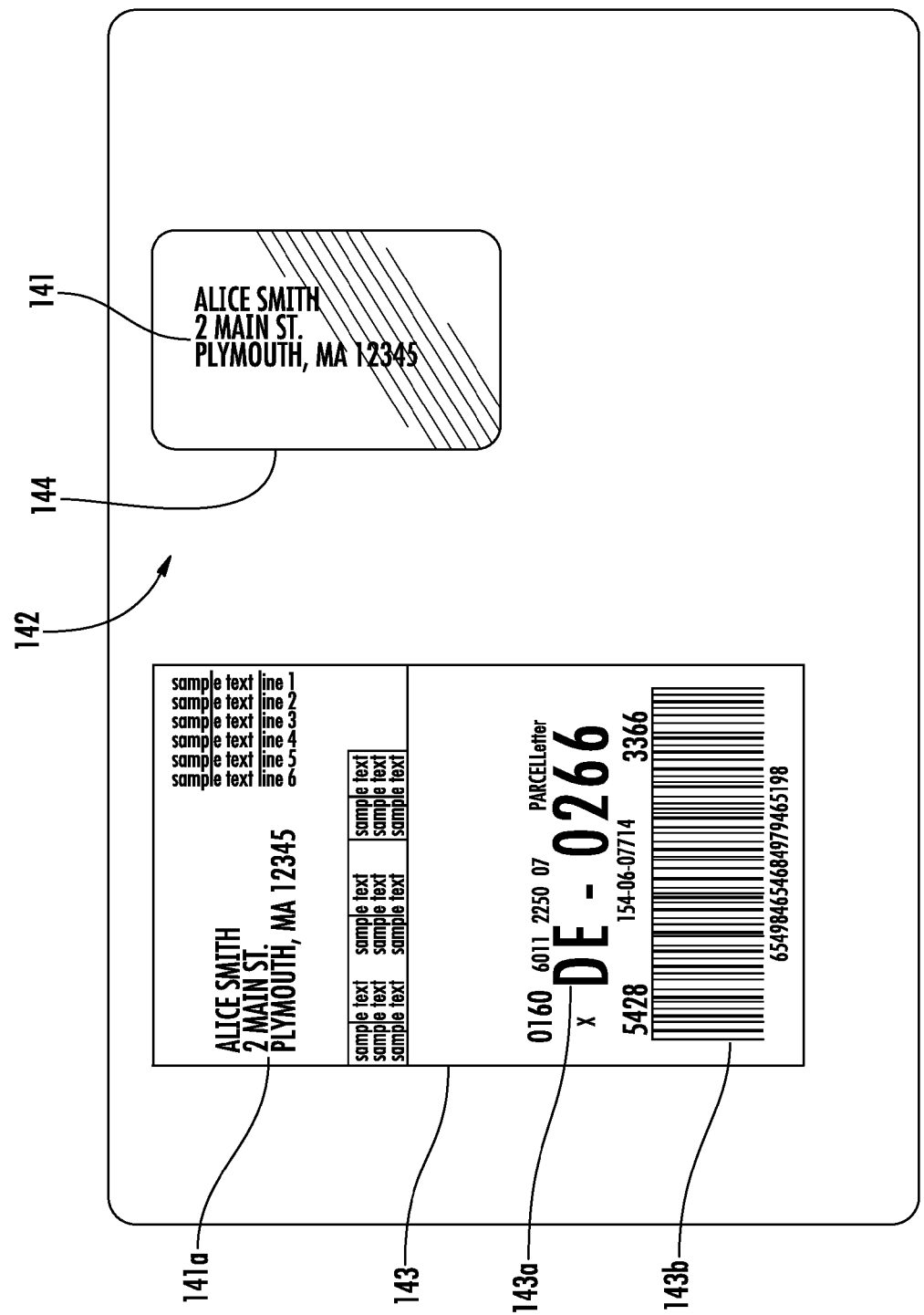
FIG. 4 illustrates a line drawing of a top surface of an exemplary delivery item comprising data visible through a window and a delivery service label according to some embodiments of the present subject matter.

Referring now to FIG. 3, an example of a double label application system 30 is illustrated. In FIG. 3, packages 60, 62 can enter the double label application system 30 from the left side on conveyer 31 and travel through the double label application system 30 and exit on the right, relative to a direction of travel 40. Packages 60, 62, 140, 142 are shown with printed address labels 141 attached. As an option, the address data may also be seen through a window 144 in the envelope mailpiece, as illustrated in FIG. 4. These printed labels 141 may contain the delivery name and address data, but are not a required shipping label. By comparison, the required shipping label 143 is applied by the label assembly 104-1. As shown on package 140 in FIG. 3, the name and address data 141 is partially covered by the shipping label 143. The coverage of the name and address data 141 by the shipping label 143 prevents the delivery person from reading or verifying the correct delivery address and name. The process to correct such a discrepancy is explained in more detail below with regard to FIG. 5.

FIG. 3 also illustrates packages on conveyer 31 being justified against the side rail 32, rather than the label printer-cutter assembly 104-1 being moved perpendicular to the direction of travel 40. However, an alternative to FIG. 3 includes a servo controlled horizontal positioning system for dynamically repositioning the label printer-applicator assembly 104-1 right or left on the package under computer control 35.

The double label application system 30 can comprise two identical label application subassemblies 100-1 and 100-2. To avoid repetitive descriptions, like parts are labeled -1 for the first label application assembly 100-1 and -2 for the second label application assembly 100-2. Each label application assembly is controlled by a control box 130-1 which includes operator controls on the top which are used for setup. The control box 130-1 contains the servo and pneumatic controllers, as well as sensor inputs. Label print data, package height data, and label placement information can be received from the labeler control computer 35. The labeler control computer 35 can also be configured to synchronize operation of each of the double label application subsystems 100-1 and 100-2 to ensure that throughput is maximized and to ensure that the label printer-applicator assembly does not collide with a package. The labeler control computer 35 can be mounted below the conveyer 31 and can be in communication with both control boxes 130-1 and 130-2.

Linerless label material can be pulled from a supply roll 120-1 by label material drive systems 126-1. The speed at which the linerless label material can be pulled from the roll 120-1 may be dependent on label usage, a position of the linerless label material in the vacuum tower 112-1, and whether the label printer-applicator assembly 104-1 is being repositioned up, down, or is stationary. Linerless label material 122-1 can be drawn into the vacuum tower 112-1 by a vacuum fan 102-1. The linerless label material 122-1 can enter the vacuum tower 112-1, form a loop in the vacuum tower, and exit on another side with the adhesive side of the linerless label material 124-1 facing in. A vertical position of each label printer-applicator assembly 104-1 can be controlled by the respective control box 130-1 using the servo motor 108-1. Servo motors 108-1 can be configured to turn a drive shaft 106-1, which is connected to a toothed drive belt within the linear actuator 110-1, which in turn is connected to each label printer-applicator assembly 104-1. The drive shaft 106-1 can be configured to drive a linear actuator on each side of the label printer-applicator assembly 104-1. While the above discussion relates to linerless label material, the presently discussed systems, methods, and computer readable media can be utilized with linered labels, as well.

Referring to FIG. 4, an exemplary envelope mailpiece, generally designated 142, is illustrated. Envelope mailpiece 142 can comprise name and address data 141 visible through a window 144 in flat mailpiece envelope and a completed delivery service label 143. The delivery service label 143 can be defined by a template with specific predefined areas, such as, but not limited to human readable delivery information 143a, delivery barcode 143b, and a name and address data field 141a. The name and address field 141a can be populated with data derived from an image of the name and address data 141, which is visible through the envelope window 144. In addition, the delivery name and address data 141 may be printed on the package or envelope or can be contained in a label attached to the package or envelope. The delivery point name and address data can also be provided, as illustrated in FIG. 4, as data visible through a clear plastic pouch containing the packing list.

Figure 5:
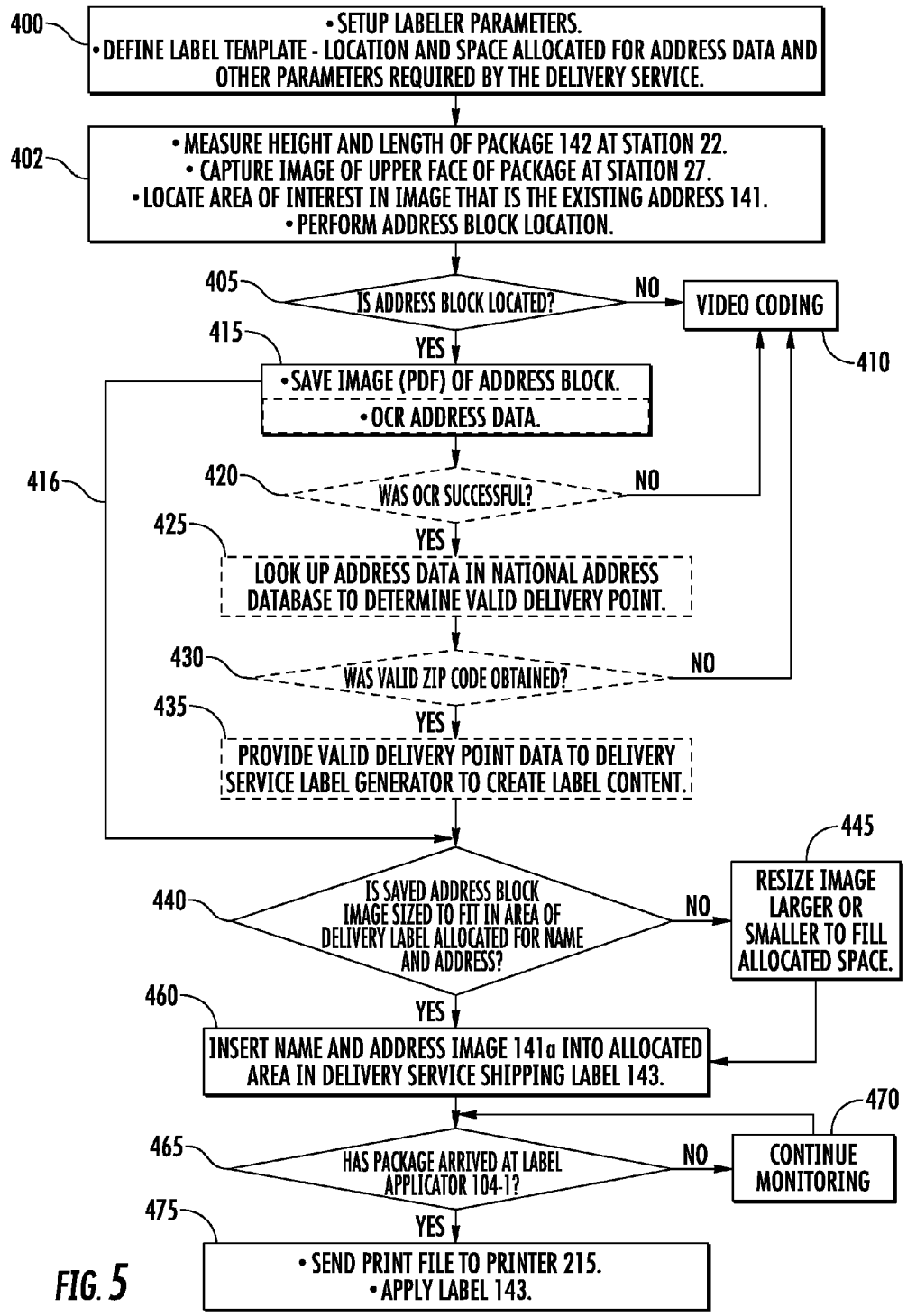
FIG. 5 illustrates a flow diagram of an exemplary process for transferring data from a delivery item to a label for application of the label onto the delivery item according to some embodiments of the present subject matter.

FIG. 5 is an exemplary labeling system process flow for transferring data from a delivery item to a label for application of the label onto the delivery item. In step 400, the operator can perform the setup procedures for the label application system 30. For example, the operator can input setup labeler parameters for the system 30, such as, defining the location and space allowed for the address data in the delivery service shipping label 143 template.

In step 402, length and height of the package or envelope 60 can be measured at station 22 (see, FIG. 1). This data can be required for the positioning of the label application system 30 to ensure the label can be attached on the upward facing side of the package or envelope 60. In many cases the location of the address data 141 on the package or envelope 60 is unknown. As a result, in step 402, camera 27 can be configured to capture an image of at least a portion of an upward facing surface of the delivery item, or any other surface or surfaces such as even side or bottom surfaces depending upon camera orientation and desired imaging, in order to be sure that the address data 141 is captured. For example, the camera 27 can capture an entirety of the upward facing surface of the package or envelope 60. If an area on the delivery item is known to contain the name and address data 141, a region of interest (ROI) can be defined to limit the size of the image that is to be processed. Address block location processing on the image may also be performed in step 402, and for example can comprise address block location processing on the image to identify an area of alpha-numeric data and/or a geometric shape of an address block. More particularly, and for example, address block location algorithms may be utilized to identify an area of alpha-numeric data that contains at least three lines and has the geometric shape of an address block.

In step 405, if the address block is not located, the image can be submitted to video coding for manual processing in step 410.

In step 415, the package or envelope may be able to save the address block image before the package or envelope reaches the labeler, depending on transport speed and the time for the video coding process to identify the address block. If the transport system gets the package or envelope to the labeler before the address block is identified and the image saved, the package or envelope may have to be diverted. If the address block is identified automatically, the image of the address block may be converted and/or saved in a format such as, but not limited to, TIFF, BMP, PNG, and JPEG for later processing.

Several optional steps may be included to improve address quality. If the optional steps are not activated, these steps are bypassed and step 415 continues onto step 440 by following path 416. If address quality is enabled, in step 415, the address block data 141 can be passed to optical character recognition (OCR) to capture the alpha-numeric data. However, some countries, such as Germany, do not allow name data, in an address block, to be processed by an OCR system due to privacy protection concerns. Thus, in optional step 420, if the OCR was unsuccessful, the image can return to optional step 410 to be submitted to video coding for manual processing. If OCR is successful, the address data can be matched against a national database to determine a valid delivery point in optional step 425.

In some embodiments, name data may be used for move update processing. For example, in optional step 430, if a valid delivery point is not determined, the image can return to optional step 410 to be submitted to video coding for manual processing. If the delivery point is validated, however, in optional step 435 the data may be used to update data associated with specific predefined areas such as, but not limited to, human readable delivery information 143a, and delivery barcode 143b.

In step 440, the saved address block image may be analyzed to determine if the image is sized to fit in the area of the delivery service shipping label 143 allocated for the name and address data 141a. If the analysis in step 440 fails, the image may be resized in step 445. For example, in step 445, the image may be resized (e.g., either made larger or smaller) in order to fill an allocated space in the template. A more detailed process for manipulating the image follows in FIG. 6 and the associated description thereof.

In step 460, the name and address image may be integrated into the delivery service shipping label 143. A more detailed process for integrating the image follows in FIG. 7 and the associated description thereof. Once integration has occurred, in step 465, the package or envelope 60 may be tracked through the package labeling processing until it has arrived at the labeler system 104-1. If the package has not arrived at the labeler system 104-1, the process can move to step 470 for continued monitoring of the label applicator 104-1.

In step 475, when the package or envelope has arrived at the label applicator 104-1, the print file may be sent to the printer 215 and the delivery service shipping label 143 may be applied to the package or envelope 60.

Figures 6, 7:
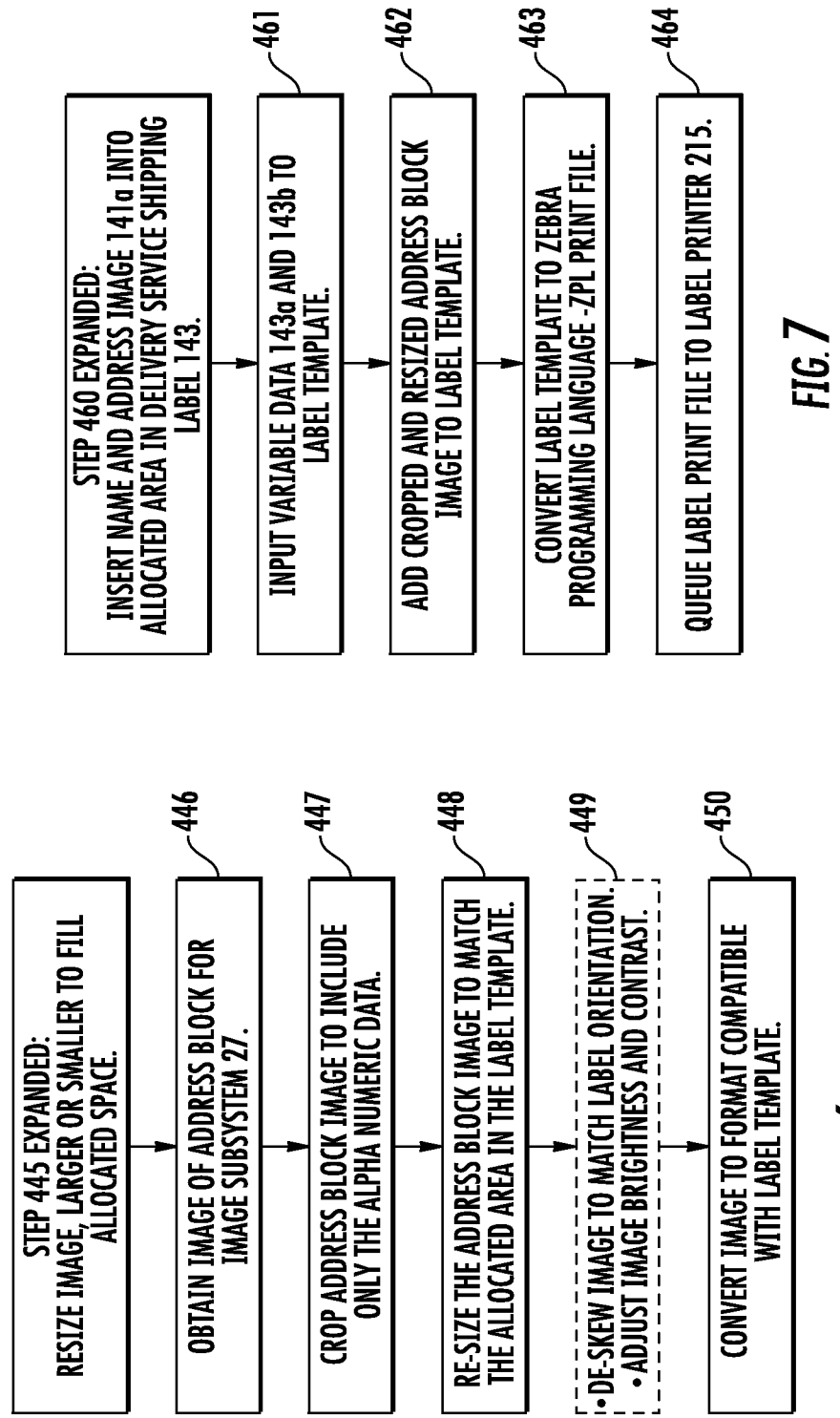
FIG. 6 illustrates an expanded flow diagram for step 445, address image processing, according to FIG. 5.
FIG. 7 illustrates an expanded flow diagram for step 450, label creation, according to FIG. 5.

Reference is now made to FIG. 6 for further detail associated with image processing; specifically step 445. In step 446, the image of the top of the package or envelope 60, captured by the camera 27 in step 402, may be retrieved from storage associated with processor 35 by the labeler control processor 35. The image may then be cropped so that it contains only the alpha-numeric name and address data.

In step 447, nearby blank areas and areas that do not meet the address block criteria may be eliminated by cropping the image. For example, a physical structure of an address block may be used by the algorithms to determine the cropping parameters. If the optional address quality process was used, the address block from this process may also be used.

In step 448, the cropped address block image may be re-sized to match the allocated area in the template of the delivery service label 143. If the name and address data on the package or envelope is skewed, the image also will be skewed.

In step 449, major orientation differences between the address data 141 and the delivery service label 143 template may optionally be corrected. For example, the image of the name and address data 141 may be rotated 90 degrees counter-clockwise before it is integrated into the template. As illustrated in FIG. 4, minor amounts of skew may not be corrected in the name and address data 141a when the name and address data is integrated into the delivery service label 143. However, if the skew is large enough to require excessive image size reduction or make the name and address data difficult to read, de-skewing may be require in optional step 449. To enhance readability of the image of the name and address by a human, the parameters such as, but not limited to, contrast, brightness or gamma may be adjusted, as required. The processed image may be converted into a format, such as but not limited to, JPEG, BMP, PDF, PNG, etc., each of which are compatible with integration into the delivery service label template in step 450.

Reference is now made to FIG. 7 for further detail associated with integration of the image into the template; specifically step 460. In step 461, variable data 143a and 143b may be input into the label template.

In step 462, the cropped, resized and de-skewed name and address block image may be inserted into the delivery service shipping label 143 template.

In step 463, the completed template may be converted into a print file, using ZEBRA® Programming Language which is compatible with a ZEBRA® printer. Other suitable printers may be substituted for the ZEBRA® printer used in this disclosure.

In step 464, the labeler control computer 35 can organize the completed print file into a queue that synchronizes sending the print file to the printer based in tracking the package or envelope through the package labeling processing line 10.

As shown by the above discussion, functions relating pertain to the operation of a warehouse and distribution center package labeling processing line wherein the labeling control is implemented in the hardware and controlled by one or more computers operating as the control computers 29, 35 connected to the label application system 30, the package measurement subsystem 22 and camera 27 which in turn are connected to a data center processor and/or server 50 for data communication with the processing resources as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the control processors 29, 35 and/or the associated terminal device 28. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for controlling the warehouse and distribution center package labeling processing line, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server. FIG. 9 illustrates a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and, as a result, the drawings should be self-explanatory.

For example, control processors 29, 35 may be a PC based implementation of a central control processing system like that of FIG. 8, or may be implemented on a platform configured as a central or host computer or server like that of FIG. 9. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of delivery items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the detailed description above, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teachings.

What is claimed is:

1. A system for transferring data from each of a plurality of delivery items to a label for application of the label onto each of the plurality of delivery items, the system comprising:
 a camera configured to capture an image of the data on each of the plurality of delivery items;
 a control computer including at least one hardware processor and memory, the control computer being configured, for each of the plurality of delivery items, to process the image of the data, integrate the image of the data captured by the camera into a label template, and generate a print file from the label template; and
 at least one label applicator disposed after the camera, relative to a direction of travel of the plurality of delivery items on a conveyor, the at least one label applicator being configured to, for each of the plurality of delivery items, print the label, including the data contained in the print file, and apply the label, after the label is printed, onto a top surface of each of the plurality of delivery items, wherein the control computer is configured to interface with the camera and the at least one label applicator, wherein a height of the at least one label applicator assembly above the conveyor is adjusted automatically to clear each of the plurality of delivery items to be labeled, wherein a movement of the plurality of delivery items along the conveyor is fully automated, and wherein a pitch between the plurality of delivery items is controllable by adjusting a speed of the conveyor between a plurality of conveyor speeds.

2. The system of claim 1, wherein the control computer is configured to process the image of the data by at least one of: cropping the image, re-sizing the image, adjusting an orientation of the image, and/or de-skewing the image in order to fit the image of the data within at least a portion of the label template.

3. The system of claim 1, wherein the camera is configured to capture an image of address data on each of the plurality of delivery items, wherein the address data is visible on each of the plurality of delivery items.

4. The system of claim 1, wherein the system is configured for address block location.

5. The system of claim 1, wherein the at least one label applicator comprises a linerless label applicator configured to adjust for variable heights of delivery items.

6. The system of claim 1, wherein the control computer is configured to process the data from the captured image with optical character recognition (OCR) in order to capture alpha-numeric data, the alpha-numeric data comprising delivery name and address data.

7. The system of claim 6, wherein the control computer is configured to compare the alpha-numeric data against name and address data stored in a database in order to identify a valid delivery address, such that, where a discrepancy is identified in the address data, the control computer is further configured to correct the delivery address data in the label template.

8. The system of claim 6, wherein the control computer is configured to utilize the delivery name data for move update processing and for correcting delivery address data in the label template.

9. The system of claim 1, wherein the data in the image captured by the camera is located using the camera, based on location algorithms or an operator specified region of interest (ROI).

10. The system of claim 1, wherein the camera is configured to capture at least a portion of the top surface of each of the plurality of delivery items.

11. The system of claim 1, wherein the control computer is configured to interface with and synchronize operation of at least two label applicators.

12. A method for transferring data from each of a plurality of delivery items to a corresponding label for application of the label onto each of the plurality of delivery items, the method comprising:

at a control computer including at least one hardware processor and memory:

interfacing with a camera and at least one label applicator disposed after the camera relative to a direction of travel of the plurality of delivery items on a conveyor;

capturing, by the camera, an image of the data on each of the plurality of delivery items;

integrating the image of the data captured by the camera into a label template;

generating a print file from the label template;

printing, by the at least one label applicator, each corresponding label, including the data contained in the print file;

automatically adjusting a height of the at least one label applicator above the conveyor to clear each of the plurality of delivery items to be labeled;

applying, by the at least one label applicator, the corresponding printed label onto a top surface of each of the plurality of delivery items; and controlling a pitch between the plurality of delivery items by adjusting a speed of the conveyor between a plurality of conveyor speeds, wherein a movement of the plurality of delivery items along the conveyor is fully automated.

13. The method of claim 12, further comprising processing the image of the data by at least one of: cropping the image, re-sizing the image, adjusting an orientation of the image, and/or de-skewing the image in order to fit the image of the data within at least a portion of the label template.

14. The method of claim 12, further comprising adjusting the at least one label applicator to adjust for variable heights of delivery items, wherein the at least one label applicator comprises a linerless label applicator.

15. The method of claim 12, further comprising processing the data from the captured image with optical character recognition (OCR) in order to capture alpha-numeric data, the alpha-numeric data comprising delivery name and address data.

16. The method of claim 15, further comprising comparing the alpha-numeric data against name and address data stored in a database in order to identify a valid delivery address, such that, where a discrepancy is identified in the address data, further comprising correcting the delivery address data in the label template.

17. The method of claim 15, further comprising utilizing the delivery name data for move update processing and for correcting the delivery address data in the label template.

18. The method of claim 12, comprising address block location processing on the image to identify an area of alpha-numeric data and/or a geometric shape of an address block.

19. The method of claim 12, wherein capturing the image of the data on each of the plurality of delivery items comprises capturing the image of the data by locating, using the camera, the data based on location algorithms or an operator specified region of interest (ROI).

20. The method of claim 12, further comprising capturing, by the camera, and manipulating, by the control computer, at least a portion of the top surface of each of the plurality of delivery items.

21. A non-transitory computer readable medium having stored thereon computer executable instructions embodied in a computer readable medium and when executed by a processor of a computer performs steps comprising:

at a control computer including at least one hardware processor and memory:

interfacing with a camera and at least one label applicator disposed after the camera relative to a direction of travel of a plurality of delivery items on a conveyor;

capturing, by the camera, an image of data on each of the plurality of delivery items;

integrating, the image of the data captured by the camera into a label template;

generating a print file from the label template;
printing, using the at least one label applicator, a corresponding label, including the data contained in the print file;
automatically adjusting a height of the at least one label applicator above the conveyor to clear each of the plurality of delivery items to be labeled;
applying, by the at least one label applicator, the printed label onto a top surface of the delivery item; and
controlling a pitch between the plurality of delivery items by adjusting a speed of the conveyor between a plurality of conveyor speeds;
wherein a movement of the plurality of delivery items along the conveyor is fully automated.

* * * * *